United States Patent
Ko et al.

(10) Patent No.: US 9,699,775 B2
(45) Date of Patent: *Jul. 4, 2017

(54) METHOD AND APPARATUS FOR TRANSMISSION AND RECEPTION IN MULTI-CARRIER WIRELESS COMMUNICATION SYSTEMS

(71) Applicant: Electronics and Telecommunications Research Institute, Daejeon (KR)

(72) Inventors: Young Jo Ko, Daejeon (KR); Bang Won Seo, Daejeon (KR); Jae Young Ahn, Daejeon (KR)

(73) Assignee: Electronics and Telecommunications Research Institute, Daejeon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/930,763

(22) Filed: Nov. 3, 2015

(65) Prior Publication Data

US 2016/0057740 A1 Feb. 25, 2016

Related U.S. Application Data

(63) Continuation of application No. 14/087,928, filed on Nov. 22, 2013, now Pat. No. 9,198,175, which is a
(Continued)

(30) Foreign Application Priority Data

Jun. 8, 2010 (KR) .................. 10-2010-0054026
Jul. 1, 2010 (KR) .................. 10-2010-0063401
Jun. 7, 2011 (KR) .................. 10-2011-0054501

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/0045* (2013.01); *H04L 1/0061* (2013.01);
(Continued)

(58) Field of Classification Search
None
See application file for complete search history.

(56) References Cited

U.S. PATENT DOCUMENTS 8,611,249 B2 * 12/2013 Ko ................. H04L 5/0053
370/252
8,724,636 B2 * 5/2014 Chen ............... H04L 1/0041
370/395.1

(Continued)

FOREIGN PATENT DOCUMENTS

JP 2013-533677 A 8/2013
KR 1020090033001 4/2009
(Continued)

OTHER PUBLICATIONS

Alcatel-Lucent et al., "Way Forward on PDCCH for Bandwidth Extension in LTE-A," 3GPP TSG RAN WG1 Meeting #58, R1-093699, 2 pages (2009).
(Continued)

*Primary Examiner* — Chi H Pham
*Assistant Examiner* — Shick Hom

(57) ABSTRACT

Data transmission and reception is provided by configuring control channels in a wireless communication system using a plurality of carriers. User equipment (UE) may monitor physical downlink control channel (PDCCH) candidates within common search spaces (CSSs) and User Equipment-specific search spaces (USSs). If the UE is configured with cross-carrier scheduling, when two PDCCH candidates originating from a CSS and a USS, respectively, have cyclic redundancy check (CRC) scrambled by the same Radio
(Continued)

| TYPE | SEARCH SPACE $S_k^{(L)}$ | | NO OF PDCCH CANDIDATES $M^{(L)}$ |
|---|---|---|---|
| | AGGREGATION LEVEL L | SIZE (CCE UNIT) | |
| UE-SPECIFIC | 1 | 6 | 6 |
| | 2 | 12 | 6 |
| | 4 | 8 | 2 |
| | 8 | 16 | 2 |
| COMMON | 4 | 16 | 4 |
| | 8 | 16 | 2 |

Network Temporary Identifier (RNTI) and have a common payload size and the same first control channel element (CCE) index, the UE may interpret that only the PDCCH originating from the CSS is transmitted, thereby solving ambiguity of downlink control information (DCI) detection.

40 Claims, 8 Drawing Sheets

Related U.S. Application Data continuation of application No. 13/709,595, filed on Dec. 10, 2012, now Pat. No. 8,611,249, which is a continuation of application No. PCT/KR2011/004163, filed on Jun. 8, 2011.

(51) Int. Cl.
- *H04W 4/00* (2009.01)
- *H04W 88/02* (2009.01)
- *H04W 88/08* (2009.01)
- *H04L 1/00* (2006.01)

(52) U.S. Cl.
CPC ............ *H04L 5/001* (2013.01); *H04L 5/0053* (2013.01); *H04W 4/00* (2013.01); *H04W 72/046* (2013.01); *H04W 88/02* (2013.01); *H04W 88/08* (2013.01)

(56) References Cited

U.S. PATENT DOCUMENTS

| | | | |
|---|---|---|---|
| 9,198,175 B2* | 11/2015 | Ko | H04L 5/0053 |
| 2009/0257449 A1 | 10/2009 | Chen et al. | |
| 2009/0318158 A1 | 12/2009 | Yamada et al. | |
| 2010/0050059 A1 | 2/2010 | Cheng | |
| 2010/0331030 A1 | 12/2010 | Nory et al. | |
| 2011/0274066 A1 | 11/2011 | Tee et al. | |
| 2012/0009963 A1 | 1/2012 | Kim et al. | |
| 2012/0044921 A1* | 2/2012 | Chung | H04J 11/0069 370/338 |

FOREIGN PATENT DOCUMENTS

| | | |
|---|---|---|
| KR | 1020090089770 | 8/2009 |
| KR | 1020090101043 | 9/2009 |
| WO | 01/39386 A1 | 5/2001 |
| WO | 2011/155759 A2 | 12/2011 |

OTHER PUBLICATIONS

Huawei, et al., "Analysis of Solutions for Handling DCI Format Ambiguity between CSS and UESS at Cross-Carrier Scheduling," 3GPP TSG RAN WG1 metting #61, R1-103086, 4 pages, (2010).

International Search Report for Application No. PCT/KR2011/004163, 5 pages, dated Feb. 10, 2012.

LG Electronics, "Handling of search space overlap in case of cross-carrier scheduling," 3GPP TSG RAN WG1 #61, R1-102690, 4 pages (2010).

LG Electronics, "Issue on handling of search space collision in case of cross-carrier scheduling," 3GPP TSG RAN WG1 #60, R1-102411, 6 pages (2010).

Nokia Siemens Networks, "Reconfigurations and Search Spaces Overlap Conflicts," 3GPP TSG RAN WG1 Meeting #61, R1-102938, 3 pages (2010).

NTT DoCoMo, "UE-Specific Search Space for Carrier Aggregation," 3GPP TSG RAN WG1 Meeting #61, R1-103245, 4 pages, (2010).

Panasonic, "Handling of overlapping common search space and UE-specific search space for cross carrier scheludling," 3GPP TSG-RAN WG1 Meeting #60bis, R1-102018, 3 pages (2010).

Research in Motion UK Limited, "Remaining issues for cross-carrier scheduling," 3GPP TSG RAN WG1 Meeting #60, R1-101621, 3 pages, (2010).

Samsung, "Confusion between CDI Formats for Different CCs, Tx Modes and Bandwidths," 3GPP TSG RAN WG1 #61, R1-102997, 3 pages (2010).

ZTE, "PDCCH blind decoding and search space for carrier aggregation of LTE-A," 3GPP TSG-RAN WG1 #61, R1-102892, 8 pages, (2010).

* cited by examiner

FIG. 1

| TYPE | SEARCH SPACE $S_k^{(L)}$ | | NO OF PDCCH CANDIDATES $M^{(L)}$ |
| --- | --- | --- | --- |
| | AGGREGATION LEVEL L | SIZE (CCE UNIT) | |
| UE-SPECIFIC | 1 | 6 | 6 |
| | 2 | 12 | 6 |
| | 4 | 8 | 2 |
| | 8 | 16 | 2 |
| COMMON | 4 | 16 | 4 |
| | 8 | 16 | 2 |

METHOD AND APPARATUS FOR TRANSMISSION AND RECEPTION IN MULTI-CARRIER WIRELESS COMMUNICATION SYSTEMS

RELATED APPLICATION

This application is a continuation patent application of U.S. patent application Ser. No. 14/087,928 filed on Nov. 22, 2013, now U.S. Pat. No. 9,198,175 issued on Nov. 24, 2015, which is a continuation patent application of U.S. patent application Ser. No. 13/709,595 filed on Dec. 10, 2012, now U.S. Pat. No. 8,611,249 issued on Dec. 17, 2013, which claims priority to, and the benefit of, Korean PCT Application No. PCT/KR2011/004163 filed on Jun. 8, 2011, which claims priority to, and the benefit of, Korean Patent Application No. 10-2010-0054026 filed on Jun. 8, 2010, Korean Patent Application No. 10-2010-0063401 filed on Jul. 1, 2010, and Korean Patent Application No. 10-2011-0054501 filed on Jun. 7, 2011. The content of the aforementioned applications is incorporated by reference.

BACKGROUND

Embodiments of the present invention relate to a method and apparatus for configuring control channels in a wireless communication system using a plurality of carriers, and performing transmission and reception.

A long Term Evolution (LTE) release 8 (Rel-8) user equipment (UE) in accordance with an LTE Rel-8 standard may receive data via a single downlink component carrier at a time. In addition, the LTE Rel-8 UE may transmit uplink control information (UCI) via an uplink component carrier corresponding to the downlink component carrier.

An LTE-Advanced (A) UE in accordance with an LTE-A standard may simultaneously receive data via a single or a plurality of downlink component carriers.

SUMMARY

An aspect of the present invention provides a user equipment (UE) and a communication method of the UE that may solve ambiguity of downlink control information (DCI) detection.

Another aspect of the present invention provides an E-UTRAN Node-B (eNB) and a communication method of the eNB that may solve ambiguity of DCI detection.

According to an aspect of the present invention, there is provided a Long Term Evolution (LTE)-Advanced user equipment (UE) to monitor physical downlink control channel (PDCCH) candidates, which are cyclic redundancy check (CRC) scrambled by Radio Network Temporary Identifier (RNTI), within common search spaces (CSSs) and User Equipment-specific search spaces (USSs), wherein when two PDCCH candidates from a CSS and a USS, respectively, are CRC scrambled by the same RNTI and have a common payload size and the same first control channel element (CCE) index, the PDCCH originating from the CSS is considered to be transmitted.

The LTE-Advanced UE may be configured to use carrier indicator field (CIF). The monitoring may mean that interpretation of each of the PDCCH candidates is attempted based on all the monitored downlink control information (DCI) formats.

The PDCCH candidates may define a search space with an aggregation level L.

The CSS may include a total of 16 CCEs from CCE 0 to CCE 15, CCEs corresponding to an $m^{th}$ PDCCH candidate may be given by $L\{(Y_k+m')\bmod \lfloor N_{CCE,k}/L \rfloor\}+i$. CCEs corresponding to an $m^{th}$ PDCCH candidate of a USS may be given by $L\{(Y_k+m')\bmod \lfloor N_{CCE,k}/L \rfloor\}+i$.

Here, $i=0, \ldots, L-1$. $N_{CCE,k}$ may denote a total number of CCEs. $m'=m$ in case of the CSS. In case of the USS, when the monitoring UE is not configured with CIF, $m'=m$. In case of the USS, when the monitoring UE is configured with CIF, $m'=m+M^{(L)} \cdot n_{CI}$, $M^{(L)}$ may denote the total number of PDCCH candidates, $n_{CI}$ may denote the value of the CIF, $m=0, \ldots, M^{(L)}-1$, and $Y_k$ may correspond to zero for the CSSs and be defined for the USSs according to $Y_k=(A \cdot Y_{k-1}) \bmod D$.

Here, $Y_{-1}=n_{RNTI} \neq 0$, $A=39827$, $D=65537$, $k=\lfloor n_s/2 \rfloor$, $n_s$ may denote a slot number, and $n_{RNTI}$ may denote an RNTI value.

The CSS may correspond to a CSS with aggregation level 4 or 8.

The USS may correspond to a USS with aggregation level 1, 2, 4, or 8.

The CSS and the USS may overlap each other.

The PDCCH candidates may have a predetermined DCI format(s) and are CRC scrambled by an RNTI.

Among the PDCCH candidates, PDCCH candidates originating from the USS may have at least one possible CIF value for the DCI format.

Among the PDCCH candidates originating from the USS, a PDCCH candidate with a given DCI format size may be transmitted from any USS corresponding to any value of the possible CIF values for the given DCI format size.

According to another aspect of the present invention, there is provided an LTE-Advanced eNB configured to transmit PDCCH in the CSSs and USSs, wherein when two PDCCH candidates from a CSS and a USS, respectively, are CRC scrambled by the same RNTI and have a common payload size and the same first CCE index, only the PDCCH candidate from the CCS is transmitted.

The PDCCH candidates may define a search space with aggregation level L.

The PDCCH candidates may have a predetermined downlink control information (DCI) format(s) and are CRC scrambled by an RNTI.

Among the PDCCH candidates, PDCCH candidates originating from the USS may have at least one possible CIF value for the DCI format.

Among the PDCCH candidates originating from the USS, a PDCCH candidate with a given DCI format size may be transmitted from any USS corresponding to any value of the possible CIF values for the given DCI format size.

According to still another aspect, there is provided a communication method of a UE, the method comprising: monitoring PDCCH candidates with CRC scrambled by an RNTI, within CSSs and USSs; and receiving PDSCH via a plurality of downlink control carriers (CCs). The monitoring may include receiving only PDCCH originating from the CSSs when the PDCCH candidates have a common payload size and the same first CCE index. The PDCCH candidates may have a predetermined downlink control information (DCI) format(s) and are CRC scrambled by an RNTI, the PDCCH candidates originating from the USSs may have at least one possible CIF value for the DCI format, and the plurality of downlink CCs may be identified based on the CIF.

The monitoring may further include receiving PDCCH originating from the CSSs and the USSs when the PDCCH candidates have different payload sizes or different first CCE indices.

The monitoring may further include interpreting each of the PDCCH candidates based on all the DCI formats that the UE needs to monitor.

The method may further include transmitting physical uplink shared channel (PUSCH) to an E-UTRAN Node-B (eNB) via a plurality of uplink CCs.

Each of the PDCCH candidates may include at least one CCE.

An aggregation level may correspond to the number of CCEs constituting each of the PDCCH candidates.

A search space may be defined independently for each aggregation level.

According to embodiments of the present invention, there may be provided a user equipment (UE) and a communication method of the UE that may solve ambiguity of downlink control information (DCI) detection.

Also, according to embodiments of the present invention, there may be provided an E-UTRAN Node-B (eNB) and a communication method of the eNB that may solve ambiguity of downlink control information (DCI) detection.

BRIEF DESCRIPTION OF DRAWINGS

FIG. 1 is a table showing properties of physical downlink control channel (PDCCH) candidates to be monitored by a user equipment (UE) according to an embodiment of the present invention;

DETAILED DESCRIPTION

Figure 2:
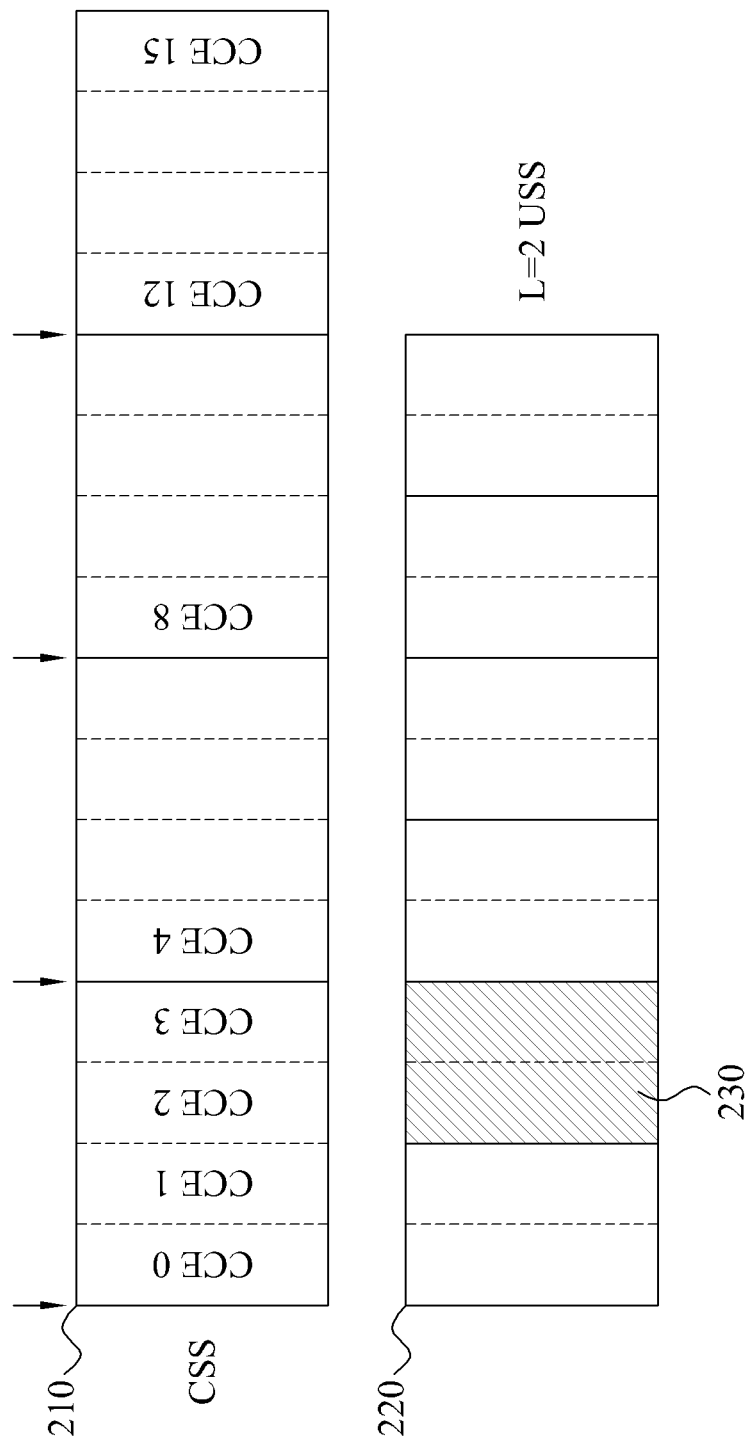
FIG. 2 is a diagram illustrating a case where a common search space (CSS) and a User Equipment-specific search space (USS) corresponding to aggregation level 2 overlap each other according to an embodiment of the present invention.

Reference is now made in detail to embodiments of the present invention, examples of which are illustrated in the accompanying drawings, wherein like reference numerals refer to the like elements throughout. The embodiments are described below in order to explain the present invention by referring to the figures.

FIG. 1 is a table showing properties of physical downlink control channel (PDCCH) candidates to be monitored by a user equipment (UE) according to an embodiment of the present invention.

Hereinafter, a structure of PDCCH according to Long Term Evolution (LTE) Release-8/9 (Rel-8/9) is described.

A single PDCCH may include a single or a plurality of control channel elements (CCEs).

The number of CCEs constituting a single PDCCH may also be referred to as aggregation level.

According to a 3$^{rd}$ Generation Partnership Project (3GPP) Technical Specification (TS) Rel-8/9, a set of PDCCH candidates to be monitored by the UE may be defined in terms of search space.

The search space may be independently defined for each PDCCH aggregation level. That is, PDCCH candidates may define a search space with aggregation level L. Also, the defined search spaces may overlap each other.

According to an LTE Rel-8/9 standard, the UE may detect control information delivered to the UE by monitoring common search spaces (CSSs) and User Equipment-specific search spaces (USSs).

The monitoring means that interpretation of each of PDCCH candidates is attempted based on all the downlink control information (DCI) formats that the UE needs to monitor.

PDCCH candidates to be monitored by the UE may be located within the search spaces.

If a search space corresponding to aggregation level L is denoted $S_k^{(L)}$, CCEs corresponding to an m$^{th}$ PDCCH candidate of the search space $S_k^{(L)}$ may be given by Equation 1:

$$L \cdot \{(Y_k + m) \bmod \lfloor N_{CCE,k}/L \rfloor\} + i \qquad \text{[Equation 1]}$$

Here, $N_{CCE,k}$ denotes the total number of CCEs available that an E-UTRAN Node-B (eNB) can use for transmitting PDCCHs.

i=0, . . . , L−1, and m=0, . . . , M$^{(L)}$−1.

M$^{(L)}$ denotes the total number of PDCCH candidates to be monitored by the UE in the given search space.

The UE may need to monitor a CSS for each of aggregation level 4 and aggregation level 8, and may need to monitor a USS for each of aggregation level 1, aggregation level 2, aggregation level 4, and aggregation level 8.

The CSSs and USSs may have an overlapping area.

Also, CCEs corresponding to an m$^{th}$ PDCCH candidate of the search space $S_k^{(L)}$ may be given by Equation 2:

$$L\{(Y_k + m') \bmod \lfloor N_{CCE,k}/L \rfloor\} + i \qquad \text{[Equation 2]}$$

Here, m'=m for the CSSs.

For the USSs, when the monitoring UE is not configured with CIF, m'=m. For the USSs, when the monitoring UE is configured with CIF, for a serving cell where PDCCH is monitored, the following Equation 3 may hold. That is, for the UE configured with CIF, the following Equation 3 may hold.

$$m' = m + M^{(L)} \cdot n_{CI} \qquad \text{[Equation 3]}$$

Here, $n_{CI}$ denotes the CIF value.

FIG. 1 shows Table 9.1.1-1 in 3GPP TS 36.213. The table in FIG. 1 shows aggregation levels L to be monitored by the UE, the sizes of the search spaces with aggregation level L (in CCEs), and the number of PDCCH candidates M$^{(L)}$ to be monitored by the UE in the search space $S_k^{(L)}$.

In the case of the CSSs, $Y_k$ may be set to 0. Thus the CSS corresponding to aggregation level 4 and the CSS corresponding to aggregation level 8 may exactly overlap each other. That is, each CSS may consist of a total of 16 CCEs from CCE 0 to CCE 15.

In the case of the USSs, $Y_k$ may be defined by Equation 4:

$$Y_k = (A \cdot Y_{k-1}) \bmod D \quad \text{[Equation 4]}$$

Here, $Y_{-1} = n_{RNTI} \neq 0$, A=39827, D=65537, and $k = \lfloor n_s/2 \rfloor$.

$n_s$ denotes the slot number, and $n_{RNTI}$ denotes the Radio Network Temporary Identifier (RNTI) value.

In the LTE-Advanced system, DCI may include carrier indicator field (CIF). The CIF may indicate which downlink CC or uplink CC is targeted by the downlink assignment information or uplink grant information. Specifically, downlink CCs may be identified based on the CIF, i.e., based on downlink assignment information of the CIF and uplink CCs may be identified based on uplink grant information of the CIF.

The PDCCH candidates may have a predetermined DCI format(s) and have cyclic redundancy check (CRC) scrambled by an RNTI, for example, Cell (C)-RNTI or semi-persistent scheduling (SPS)C-RNTI, and may have one or more possible CIF values for the DCI format.

Among the PDCCH candidates originating from the USSs, a PDCCH candidate with a given DCI format size may be transmitted from any USS corresponding to any value of the possible CIF values for the given DCI format size.

Figure 3:
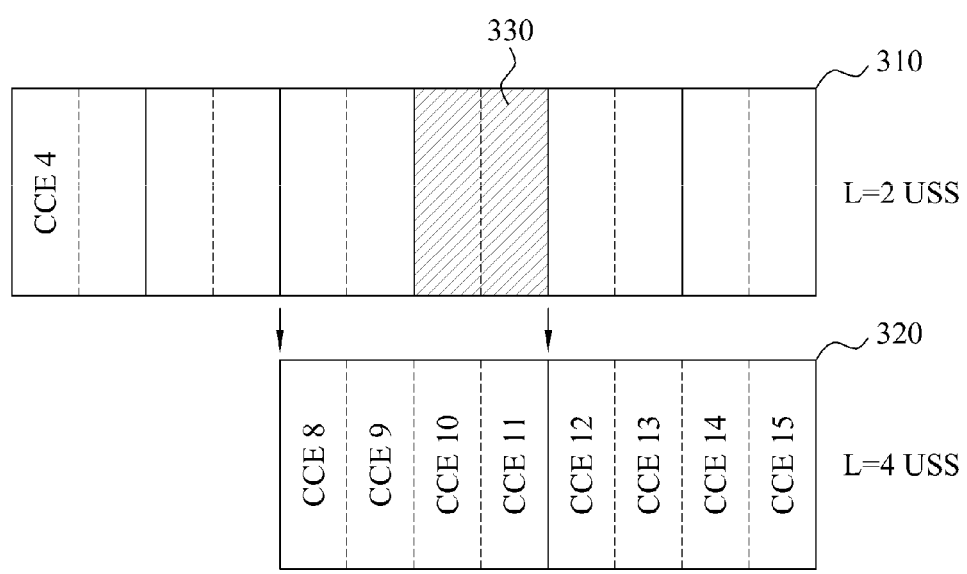
FIG. 3 is a diagram illustrating a case where a USS corresponding to aggregation level 2 and a USS corresponding to aggregation level 4 overlap each other according to an embodiment of the present invention.

FIG. 2 and FIG. 3 are diagrams to describe why ambiguity of DCI detection may occur in an LTE Rel-8/9 standard not using carrier aggregation and a method of avoiding the ambiguity.

The LTE may use a circular buffer for PDCCH channel coding and rate matching. Accordingly, a codeword obtained after the channel coding may be repeated in a circular manner.

When considering a single PDCCH including a total of M CCEs from CCE k to CCE (k+M−1), the contents of the starting CCE, which is CCE k, may repeat in CCE i (k<i<k+M).

In this case, if CCE i corresponds to one of the starting CCEs of a UE's USS with aggregation level L, when the UE attempts PDCCH detection with respect to L CCEs from CCE i to CCE (i+L−1) with CCE i as the starting CCE, it may be possible that the detection result passes the CRC test.

In this case, the UE may recognize CCE i as the starting CCE. However, the eNB has actually transmitted CCE k as the starting CCE.

Especially, the index of the starting CCE may be used for mapping of PUCCH acknowledgement (ACK)/negative-acknowledgement (NAK) channel resources. Accordingly, when the UE erroneously recognizes the starting CCE, it may cause erroneous mapping of ACK/NAK resources.

FIG. 2 is a diagram illustrating a case where a CSS 210 and a USS 220 corresponding to aggregation level 2 overlap each other according to an embodiment of the present invention.

In a case where the CSS 210 and the USS 220 corresponding to aggregation level 2 are formed as shown in FIG. 2, even though an eNB actually transmits a PDCCH using CCE 0 through CCE 3 of the CSS 210, a UE may attempt PDCCH detection for the shaded part 230. In this case, it may be possible that the demodulation result for the shaded part 230 passes the CRC test.

In contrast, when the eNB transmits a PDCCH corresponding to aggregation level 2 using (CCE 2, CCE 3), even though the UE attempts to detect a PDCCH corresponding to aggregation level 4 with respect to CCE 0 through CCE 3 of the CSS 210, it may be possible that the CRC test for the detection is passed.

In the above example, "(CCE 2, CCE 3)" indicates CCE 2 and CCE 3.

FIG. 3 is a diagram illustrating a case where a USS 310 corresponding to aggregation level 2 and a USS 320 corresponding to aggregation level 4 overlap each other according to an embodiment of the present invention.

In a case where an overlapping area occurs between the USS 310 corresponding to aggregation level 2 and the USS 320 corresponding to aggregation level 4 as shown in FIG. 3, even though an eNB actually transmits a PDCCH using CCE 8 through CCE 11, that is, a PDCCH corresponding to aggregation level 4, the UE may succeed in detecting a PDCCH corresponding to aggregation level 2 for the shaded part (CCE 10, CCE 11) 330.

In contrast, even though the eNB actually transmits a PDCCH corresponding to aggregation level 2 using (CCE 10, CCE 11), the UE may succeed in detecting a PDCCH corresponding to aggregation level 4 with respect to CCE 8 through CCE 11.

In order to avoid the aforementioned problem explained by referring to FIG. 2 and FIG. 3, in LTE Rel-8/9, the contents of CCE k corresponding to the starting CCE is not allowed to be repeated in other subsequent CCEs.

Specifically, a single CCE may transmit a total of 72 bits. Also, tail-biting convolutional coding with a coding rate of ⅓ may be used for PDCCH encoding. Information may go through 16-bit CRC coding before being input to a channel encoder.

The basic output length of the channel encoder may be 3×(payload size+16) bits. The bits may sequentially fill in a number of CCEs corresponding to the aggregation level of PDCCH.

That is, when a PDCCH transmits a length longer than the basic length, the contents of the basic length may be sequentially repeated.

Further details of the method for preventing the aforementioned repetition are disclosed in 3GPP TS 36.212 5.1.4.2.

Considering that the aggregation level 8 for the CSS is the maximum aggregation level, that is, considering that a single PDCCH may use up to 8 CCEs, a set of payload sizes having ambiguity may be expressed by Equation 5:

$$\{a > 0 | \text{common multiple}(3 \times (a+16), 72) < 72 \times 8\} \quad \text{[Equation 5]}$$

Excluding the payload sizes which are not used in the specification because they are too short or too long, the payload sizes having ambiguity are given in Table 1. Table 1 corresponds to Table 5.3.3.1.2-1 in 3GPP TS 36.212.

That is, Table 1 shows payload sizes causing ambiguity.

The payload sizes of Table 1 are not used in the LTE Rel-8/9 since the contents of the starting CCE may repeat in a subsequent CCE(s) with those payload sizes.

TABLE 1

| {12, 14, 16, 20, 24, 26, 32, 40, 44, 56} |
|---|

In the following, the embodiment of FIG. 2 is reviewed for the case where the aforementioned method is applied.

In a case where the eNB actually transmits a PDCCH using CCE 0 through CCE 3 of the CSS 210, even though the UE attempts PDCCH detection for the shaded part 230, a case where the demodulation result for the shaded part 230 passes the CRC test may rarely occur. That is, the demodulation result for the shaded part 230 may pass the CRC test at a usual undetected error rate.

In addition, when the eNB transmits a PDCCH corresponding to aggregation level 2 using (CCE 2, CCE3) of the USS 220, and when the UE attempts to detect a PDCCH corresponding to aggregation level 4 with respect to CCE 0 through CCE 3 of the CSS 210, the demodulation result with respect to CCE 0 through CCE 3 may pass the CRC test at a usual undetected error rate.

The aforementioned description may be similarly applicable to the embodiment of FIG. 3.

According to the LTE Rel-8/9 standard, DCI formats 0, 1, 1A, 1B, 1D, 2, 2A, and 2B may be CRC scrambled by a C-RNTI. These DCI formats can be transmitted in the USSs. The DCI formats 0 and 1A may be also transmitted in the CSSs.

The DCI formats 0, 1, 1A, 2, 2A, and 2B may be CRC scrambled by an SPS C-RNTI, and may be transmitted in the USSs. The DCI formats 0 and 1A may be also transmitted in the CSSs.

The DCI formats 0, 1, and 1A may be CRC scrambled by a temporary C-RNTI. In this case, the DCI format 0 may be transmitted in the CSSs and the DCI format 1 may be transmitted in the USSs, and the DCI format 1A may be transmitted in both the CSSs and the USSs.

Because of the aforementioned reasons described above with reference to FIG. 2 and FIG. 3, all the DCI formats, for example, the DCI formats 1, 1A, 1B, 1D, 2, 2A, and 2B, which are transmitted in the USSs and are associated with downlink resource allocation, may avoid transmission with the payload sizes shown in Table 1.

In LTE-Advanced Rel-10 standard and later versions, the ambiguity of PDCCH detection may be avoided by applying the above scheme for all the DCI formats (i.e., the existing DCI formats of Rel-8/9 and newly defined DCI formats) that are transmitted in the USSs and are used for downlink resource allocation.

Figure 4:
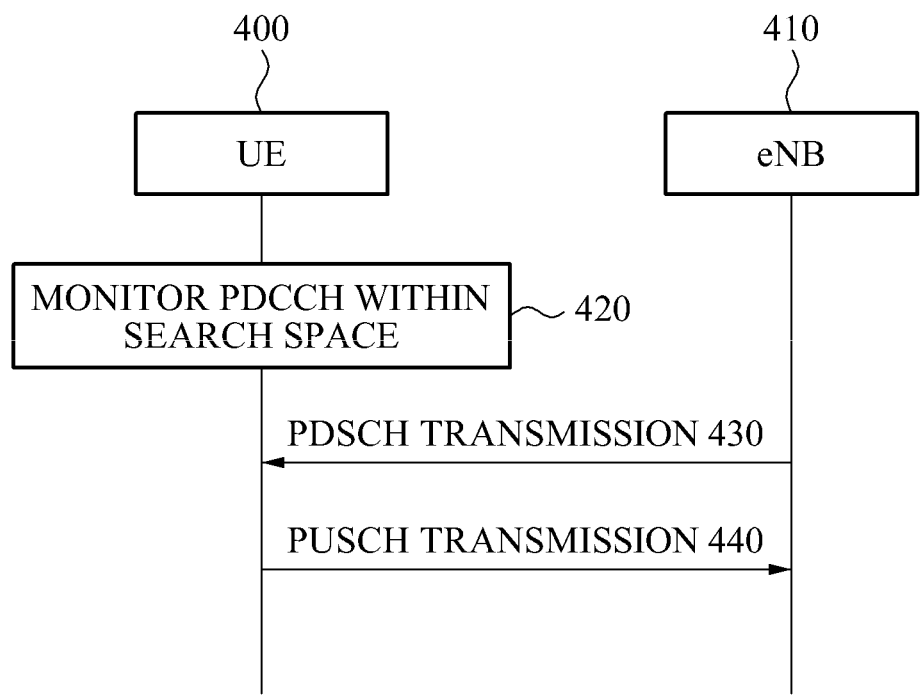
FIG. 4 is a diagram illustrating a communication method of an E-UTRAN Node-B (eNB) and a UE in a Long Term Evolution (LTE)-Advanced system according to an embodiment of the present invention.

FIG. 4 is a diagram to describe a communication method of an eNB 410 and a UE 400 in an LTE-Advanced system according to an embodiment of the present invention.

In operation 420, the UE 400 may monitor PDCCH search spaces.

A PDCCH may transmit DCI information which is downlink assignment information or uplink grant information.

That is, the UE 400 may be configured to monitor PDCCH candidates with CRC scrambled by an RNTI and the like, within CSSs and USSs.

In operation 430, the eNB 410 may transmit physical downlink shared channel (PDSCH) to the UE 400 via a plurality of downlink CCs.

In operation 440, the UE 400 may transmit physical uplink shared channel (PUSCH) to the eNB 410 via a plurality of uplink CCs.

The PDCCH search spaces to be monitored by the UE 400 may be divided into CSSs and USSs.

The USSs may be defined for each CC. For example, when the UE 400 is configured to use N downlink CCs, the UE 400 may have N individual USS sets.

When the UE 400 does not use cross-carrier scheduling, search spaces may be defined on each CC.

When the UE 400 uses cross-carrier scheduling, a plurality of search space sets may be defined on a single CC. For example, two USS sets corresponding to two CCs may be defined within a single CC.

The CSS size may be configured to be the same, regardless of the number of downlink CCs configured for the UE 400. For example, the CSS may include 16 CCEs from CCE 0 through CCE 15 as in LTE Rel-8/9.

The CSS size may be configured to vary depending on the number of downlink CCs configured for the UE 400. In this case, the size of the CSS may be configured to increase with an increase in the number of configured CCs.

Hereinafter, the ambiguity of DCI detection that may occur due to cross-carrier scheduling is described. Specifically, a CSS and USS configuration method of the UE 400 using cross-carrier scheduling is described and a method of solving the ambiguity of DCI detection is described.

In the following description, it may be assumed that the method of avoiding the ambiguity of DCI detection in LTE, described in the above with reference to FIG. 2 and FIG. 3, is applied to an LTE-Advanced system.

For the UE 400 using cross-carrier scheduling, the eNB 410 may include CIF within DCI formats transmitted in the USSs. The eNB 410 may inform the UE 400 of which CC is scheduled for the UE using the CIF value. A DCI format to be transmitted in the CSSs may not have CIF. A DCI format transmitted in the USS of the UE 400 using cross-carrier scheduling may generally have CIF.

16 bit CRC may be added to DCI transmitted by PDCCH. When 16 bits of CRC is added, CRC scrambling may be performed using an RNTI.

The DCI format 0 and the DCI format 1A may be CRC scrambled by a C-RNTI or an SPS C-RNTI. The DCI format 0 and the DCI format 1A may be transmitted in a CSS or USS.

DCI transmitted in the CSSs may not include CIF.

DCI that is transmitted only in the USSs and is scrambled by the C-RNTI or the SPS C-RNTI may include CIF at all times.

First DCI that is transmitted only in the USSs and is scrambled by the C-RNTI or the SPS C-RNTI, and second DCI that is transmitted only in the CSSs and is CRC scrambled by the C-RNTI or the SPS C-RNTI may have the same payload size. Also, an overlapping area may occur between the CSSs and the USSs.

In an area where search spaces overlap each other, even though the UE 400 succeeds in PDCCH detection, the UE 400 may not be able to determine which format between the two DCI formats having the same payload size is actually transmitted. Here, that the UE 400 has succeeded in the PDCCH detection means that the information bits obtained by the UE 400 after performing PDCCH demodulation and decoding have passed the CRC test.

The aforementioned issue that the UE 400 may not be able to determine which DCI format is transmitted may occur only when two DCI formats originating from a CSS and a USS, respectively, are scrambled by the same RNTI and have the same payload size in the overlapping area between the CSS and the USS.

The DCI format 0 and the DCI format 1A may be transmitted in the CSS and the DCI format 0 and the DCI format 1 A may have the same payload size. If a USS DCI format, among the USS DCI formats to be monitored by the UE 400, has the same payload size and is CRC scrambled by the same RNTI, for example, a C-RNTI or an SPS C-RNTI as the DCI format 0 and the DCI format 1A originating from the CCS, the aforementioned issue may occur.

The above cases where the UE 400 may not be able to determine which DCI format is transmitted may be examined by classifying them into the following cases 1) through 4):

Case 1) where a CSS and a USS corresponding to aggregation level 1 overlap each other;

Case 2) where a CSS and a USS corresponding to aggregation level 2 overlap each other;

Case 3) where a CSS and a USS corresponding to aggregation level 4 overlap each other; and Case 4) where a CSS and a USS corresponding to aggregation level 8 overlap each other.

The CSS size may be designed to change depending on the number of downlink CCs configured for the UE 400. Solutions to be described below may assume that the structure and the size of the CSSs is the same as the structure and the size of the CSSs used in the LTE Rel-8/9. However, the solutions may also be applicable to CSSs having different structures and sizes.

Figure 5:
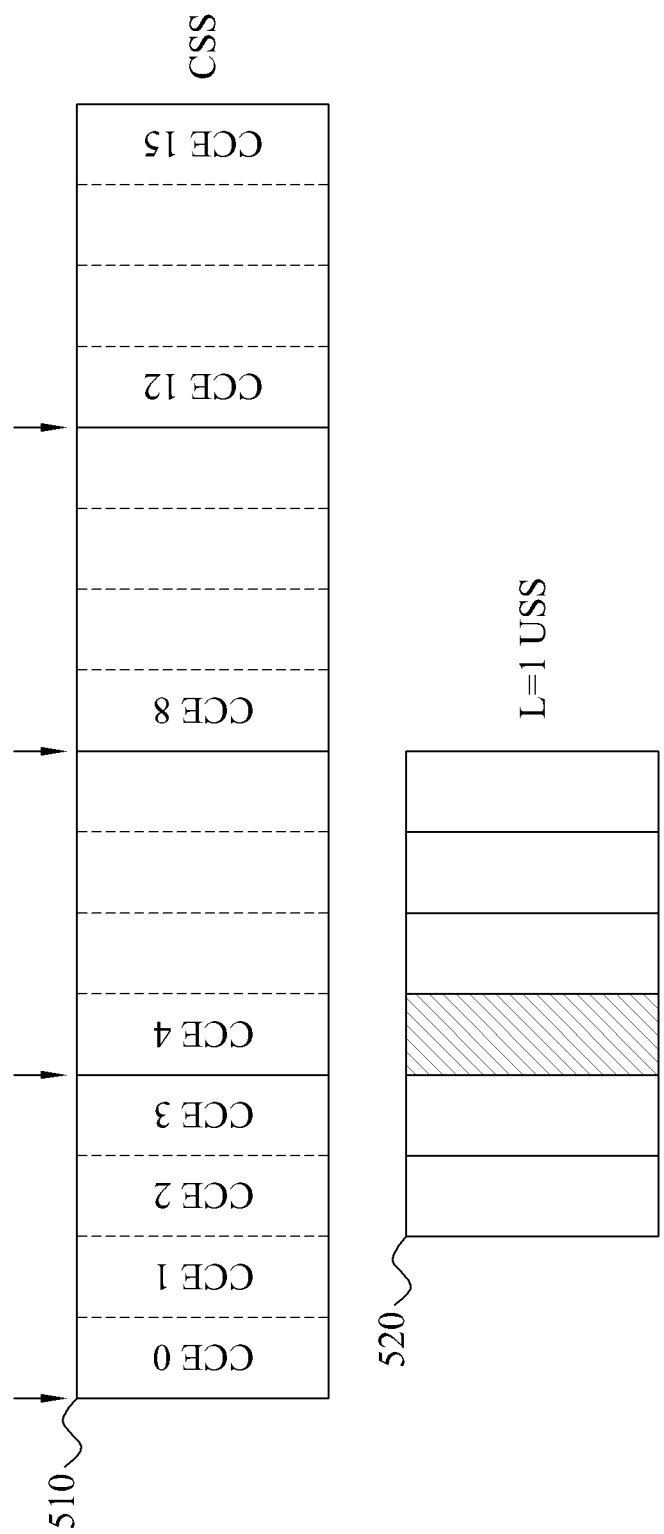
FIG. 5 is a diagram illustrating a case where a CSS and a USS corresponding to aggregation level 1 overlap each other according to an embodiment of the present invention.

FIG. 5 is a diagram illustrating a case where a CSS 510 and a USS 520 corresponding to aggregation level 1 overlap each other according to an embodiment of the present invention.

When the UE 400 attempts detection with respect to CCE 4, the UE 400 may successfully demodulate a PDCCH.

However, the UE 400 may not be able to determine from which search space between the CSS 510 and the USS 520 the detected DCI originates. Accordingly, even though the UE 400 successfully detects the PDCCH, a problem may occur in interpreting the contents of the DCI format.

In contrast, even though the UE 400 attempts to detect a PDCCH corresponding to aggregation level 4 with respect to CCE 4 through CCE 7 and thereby succeeds in the PDCCH detection, the UE 400 may not be able to determine from which search space between the CSS 510 and the USS 520 the detected DCI originates.

Figure 6:
FIG. 6 is a diagram illustrating a case where a CSS and a USS corresponding to aggregation level 2 overlap each other according to an embodiment of the present invention.

FIG. 6 is a diagram illustrating a case where a CSS 610 and a USS 620 corresponding to aggregation level 2 overlap each other according to an embodiment of the present invention.

The UE 400 may attempt detection with respect to (CCE 4, CCE 5) and thereby may succeed in PDCCH demodulation.

However, even though the UE 400 successfully demodulates the PDCCH, the UE 400 may not be able to determine from which search space between the CSS 610 and the USS 620 the detected DCI originates. Accordingly, regardless of the UE 400 succeeding in the PDCCH detection, a problem may occur in interpreting the contents of the DCI format. The same problem may also occur for (CCE 8, CCE 9) and (CCE 12, CCE 13).

In contrast, even though the UE 400 attempts to detect a PDCCH corresponding to aggregation level 4 with respect to CCE 4 through CCE 7, CCE 8 through CCE 11, or CCE 12 through CCE 15 and thereby succeeds in the PDCCH detection, the UE 400 may not be able to determine from which search space between the CSS 610 and the USS 620 the detected DCI originates.

Figure 7:
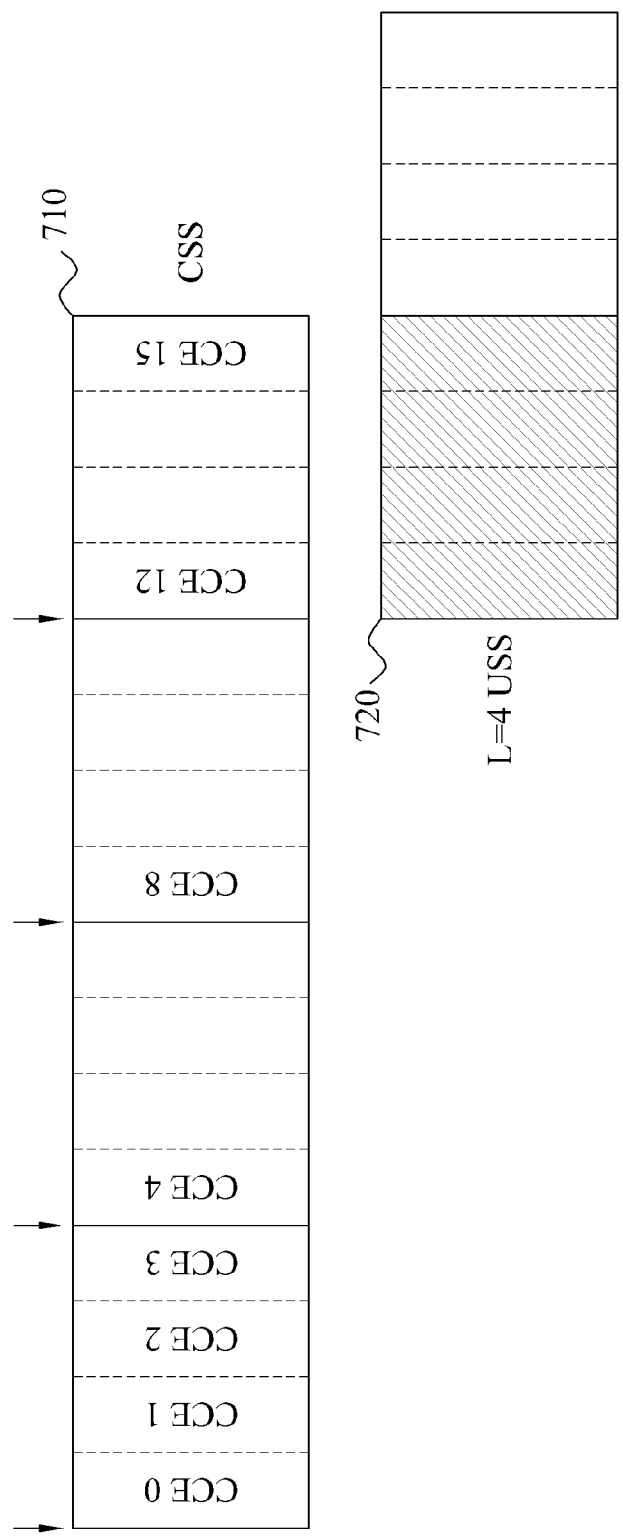
FIG. 7 is a diagram illustrating a case where a CSS and a USS corresponding to aggregation level 4 overlap each other according to an embodiment of the present invention.

FIG. 7 is a diagram illustrating a case where a CSS 710 and a USS 720 corresponding to aggregation level 4 overlap each other according to an embodiment of the present invention The same problem described above with reference to FIG. 5 and FIG. 6 may also occur for CCE 12 through CCE 15.

Figure 8:
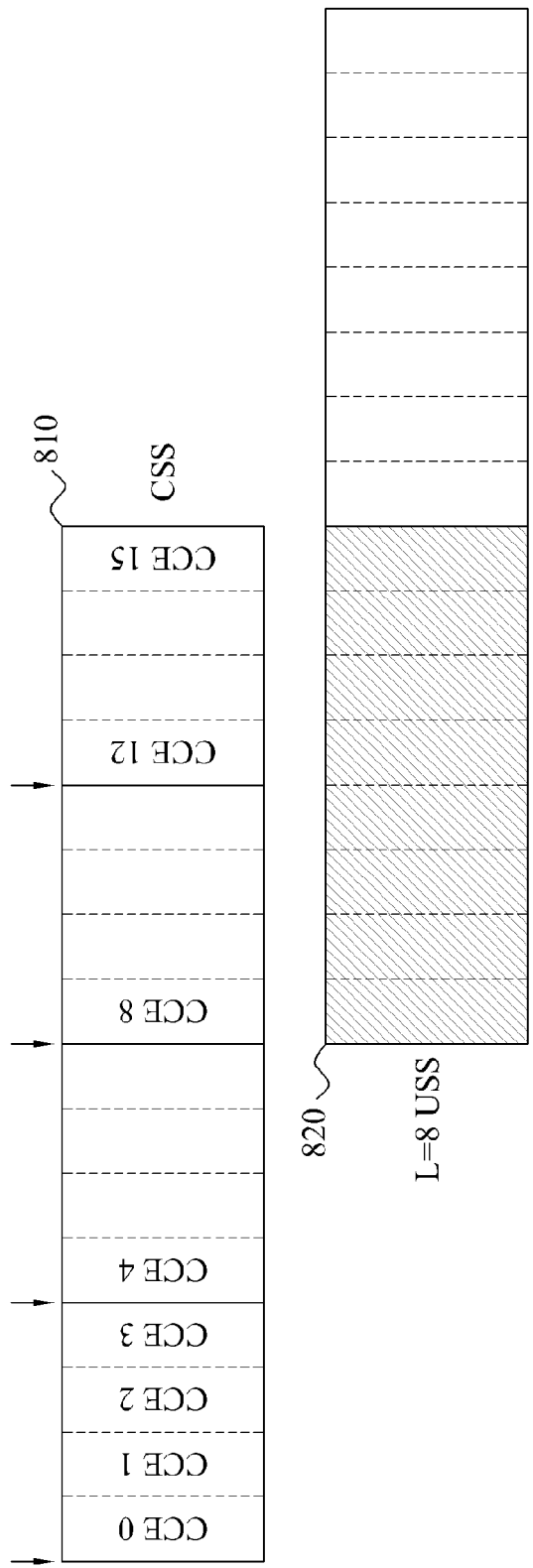
FIG. 8 is a diagram illustrating a case where a CSS and a USS corresponding to aggregation level 8 overlap each other according to an embodiment of the present invention.

FIG. 8 is a diagram illustrating a case where a CSS 810 and a USS 820 corresponding to aggregation level 8 overlap each other according to an embodiment of the present invention The same problem described above with reference to FIG. 5 and FIG. 6 may also occur for CCE 8 through CCE 15.

Hereinafter, the description made above with reference to FIG. 5 through FIG. 8 is summarized. When the UE 400 attempts PDCCH detection by employing, as the starting CCE, one of the possible starting CCEs, for example, CCE 0, CCE 4, CCE 8, or CCE 12, of the CSS 510, 610, 710, or 810 in an area where the CSS 510, 610, 710, or 810, and the USS 520, 620, 720, or 820 overlap each other, a problem may occur in interpreting DCI detected by the UE 400.

Therefore, to solve the above problem, when the UE 400 attempts detection by employing, as the starting CCE, CCE 0, CCE 4, CCE 8, or CCE 12 in the overlapping area between the CSS and the USS, a constraint may be applied so that the detected DCI may be interpreted to originate from the CSS or the USS at all times.

Hereinafter, description is made about a constraint in which the detected DCI is interpreted to originate from the CSS. The above constraint may be defined by 1) and 2):

1) When the eNB 410 transmits the DCI, the eNB 410 may transmit the DCI in the CSS without any constraint; and 2) In the overlapping area between the CSS and the USS, the eNB 410 may transmit USS DCI only when the starting CCE of DCI originating from the USS does not correspond to any of the possible starting CCEs, for example, CCE 0, CCE 4, CCE 8, and CCE 12 of CSS PDCCH candidates.

Compared to the scheme allowing only DCI transmission originating from the CSS for the whole overlapping area between the CSS and the USS, the above scheme may have an advantage in that USS DCI may be transmitted in some parts of the overlapping area.

When the above constraint is applied to the USS corresponding to aggregation level 4 or USS corresponding to aggregation level 8, the DCI transmission originating from the USS may not be allowed in the overlapping area between the CSS and the USS. This is because the starting CCE of a PDCCH candidate of the USS always corresponds to a starting CCE of a PDCCH candidate of the CSS.

However, even though the above constraint is applied to the USS corresponding to aggregation level 1 or the USS corresponding to aggregation level 2, a CCE not overlapping with the starting CCEs of the PDCCH candidates of the CSS may be present in the USS corresponding to aggregation level 1 or in the USS corresponding to aggregation level 2. Accordingly, when the starting CCE does not correspond to one of possible starting CCEs of the CSS DCI, the USS DCI may be transmitted even in the overlapping area between the CSS and the USS.

For example, in FIG. 5, each of CCE 2, CCE 3, CCE 5, CCE 6, and CCE 7 excluding CCE 4 may be a valid PDCCH candidate of the USS. In addition, in FIG. 6, (CCE 2, CCE 3), and (CCE 6, CCE 7) may be valid PDCCH candidates of the USS.

Alternatively, in the overlapping area between the CSS and the USS, when the UE 400 attempts detection by employing, as the starting CCE, CCE 0, CCE 4, CCE 8, or CCE 12, a constraint may be applied so that a detected DCI is to be interpreted to originate from the USS at all times.

That is, when the eNB 410 transmits DCI, and when the starting CCE corresponds to one of the possible starting CCEs of the CSS PDCCH candidates, for example, CCE 0, CCE 4, CCE 8, and CCE 12 in the overlapping area of the CSS and the USS, the eNB 410 may transmit only USS DCI. In this case, the UE 400 may consider only the USS DCI is transmitted in the overlapping area between the CSS and the USS in detecting and interpreting a PDCCH.

Summarizing the aforementioned description, the following two methods (1) and (2) may be employed.

(1) In the overlapping area between the CSS and the USS, the UE 400 may interpret a PDCCH, which is considered to have DCI format ambiguity, as a CSS DCI format. That is, when PDCCH candidates have a common payload size and the same first CCE index, the eNB 410 may transmit only a PDCCH from the CSS and the UE 400 may interpret or consider that only the PDCCH from the CSS is transmitted. In this example, PDCCH candidates from the CSS may be referred to as first PDCCH candidates and PDCCH candidates from the USS may refer to as second PDCCH candidates. When the first PDCCH candidates and the second PDCCH candidates have a common payload size and the same first CCE index, the UE 400 may determine that a PDCCH among the first PDCCH candidates is transmitted.

(2) In the overlapping area between the CSS and the USS, the UE 400 may interpret, a PDCCH, which is considered to have DCI format ambiguity, as a USS DCI format.

Hereinafter, methods of fundamentally removing the ambiguity of DCI detection, different from the aforementioned (1) and (2) are described.

1) As a first method, different scrambling sequences may be applied to the whole payload for the CSS DCI format and the USS DCI format.

The payload may include information bits and 16 bit CRC. When CRC is generated for information bits, the payload may be generated by adding the generated CRC to the information bits. Bit-level scrambling may be applied to the whole generated payload. Even though the bit-level scrambling may be applied in the same form as in the 3GPP standard TS 36.211 v 8.7.0 6.3.1, different initialization values $c_{init}$ for the scrambling sequence generator may need to be applied for the CSS DCI formats and the USS DCI formats.

Since the initialization values for the scrambling sequence generator are different for CSS DCI formats and USS DCI formats, the CSS DCI formats and the USS DCI formats may be scrambled by different scrambling sequences. Therefore, the UE 400 may be able to determine which DCI format is transmitted.

2) As a second method, cyclic shifts with different offsets for the CSS DCI format and the USS DCI format can be applied for the bit stream of the whole payload.

That is, when the bit stream of the payload of the DCI format is "x(1), x(2), . . . x(N)", x(i) may be changed to x((i+q) mod N)) by applying offset q(0<q<N) to the bitstream. Here, x(i) denotes the $i^{th}$ bit. For example, if q=3, the bit order may be changed to x(4), x(5), . . . x(N), x(1), x(2), x(3).

If the offset value of the CSS DCI format and the offset value of the USS DCI format are set to be different, the UE 400 may be able to determine which format is transmitted.

3) As a third method, CRC scrambling may be performed by applying different RNTIs for the CSS DCI format and the USS DCI format. If different RNTIs are allocated and are used for the CSS DCI format and the USS DCI format, ambiguity between the CSS DCI format and the USS DCI format may not occur.

4) As a fourth method, the payload size of the CSS DCI format and the payload size of the USS DCI format may be maintained to be different from each other at all times. For example, the CSS DCI format and the USS DCI format may have different payload sizes by applying bit padding.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A communication apparatus, comprising: one or more antennas, a transceiver for performing wireless transmission and reception, a memory, and a processor operably coupled to the one or more antennas, the transceiver and the memory, to execute program instructions stored in the memory,
   wherein the processor, when executing the program instructions:
      generates a plurality of Physical Downlink Control Channel (PDCCH) candidates including a first PDCCH candidate,
      transmits the plurality of PDCCH candidates including the first PDCCH candidate in Common Search Space (CSS) and User equipment-specific Search Space (USS),
   wherein the first PDCCH candidate is transmitted in the CSS, wherein no PDCCH candidate transmitted in the USS satisfies a first condition, wherein the first condition is satisfied when the first PDCCH candidate in the CSS and a second PDCCH candidate in the USS have:
      (1) Cyclic redundancy check (CRC) scrambled by a same Radio Network Temporary Identifier (RNTI),
      (2) a same payload size,
      (3) a same first Control Channel Element (CCE) index, and
      (4) different sets of Downlink Control Information (DCI) information fields.

2. The apparatus of claim 1, wherein the set of DCI information fields of the second PDCCH candidate includes a carrier indicator field.

3. The apparatus of claim 1, wherein the processor, when executing the program instructions, causes the transceiver to transmit a signal to cause a User Equipment (UE) to be configured with a carrier indicator field.

4. The apparatus of claim 1, wherein the RNTI is a C-RNTI (Cell-RNTI) or a Semi-Persistent Scheduling (SPS) C-RNTI.

5. The apparatus of claim 1, wherein the CSS has an aggregation level 4 or 8, and the USS has an aggregation level 1, 2, 4, or 8.

6. The apparatus of claim 1, wherein the set of DCI information field of the first PDCCH candidate is DCI format 0 or DCI format 1A.

7. A communication method, comprising:
   generating a plurality of Physical Downlink Control Channel (PDCCH) candidates including a first PDCCH candidate; and transmitting the plurality of PDCCH candidates including the first PDCCH candidate in Common Search Space (CSS) and User equipment-specific Search Space (USS), wherein the first PDCCH candidate is transmitted in the CSS, wherein no PDCCH candidate transmitted in the USS satisfies a first condition, wherein the first condition is satisfied when the first PDCCH candidate in the CSS and a second PDCCH candidate in the USS have:
(1) Cyclic redundancy check (CRC) scrambled by a same Radio Network Temporary Identifier (RNTI),
(2) a same payload size,
(3) a same first Control Channel Element (CCE) index, and
(4) different sets of Downlink Control Information (DCI) information fields.

8. The method of claim 7, wherein the set of DCI information fields of the second PDCCH candidate includes a carrier indicator field.

9. The method of claim 7, further comprising transmitting a signal to cause a User Equipment (UE) to be configured with a carrier indicator field.

10. The method of claim 7, wherein the RNTI is a Cell-RNTI (C-RNTI) or a Semi-Persistent Scheduling (SPS) C-RNTI.

11. The method of claim 7, wherein the CSS has an aggregation level 4 or 8, and the USS has an aggregation level 1, 2, 4, or 8.

12. The method of claim 7, wherein the set of DCI information field of the first PDCCH candidate is DCI format 0 or DCI format 1A.

13. A communication apparatus, comprising: one or more antennas, a transceiver for performing wireless transmission and reception, a memory, and a processor operably coupled to the one or more antennas, the transceiver and the memory, to execute program instructions stored in the memory,
wherein the processor, when executing the program instructions:
generates a plurality of Physical Downlink Control Channel (PDCCH) candidates including a first PDCCH candidate; and
causes the transceiver to transmit the plurality of PDCCH candidates including the first PDCCH candidate in Common Search Space (CSS) and User Equipment-specific Search Space (USS), wherein:
the first PDCCH candidate is transmitted in the CSS, and
the first PDCCH candidate and any one of the plurality of PDCCH candidates transmitted in the USS do not have a combination of:
(1) Cyclic redundancy check (CRC) scrambled by a same Radio Network Temporary Identifier (RNTI),
(2) a same payload size,
(3) a same first Control Channel Element (CCE) index, and
(4) different sets of Downlink Control Information (DCI) information fields.

14. The apparatus of claim 13, wherein a set of DCI information fields of any of PDCCH candidates transmitted in the USS includes a carrier indicator field.

15. The apparatus of claim 13, further comprising transmitting a signal to cause a User Equipment (UE) to be configured with a carrier indicator field.

16. The apparatus of claim 13, wherein the RNTI is a Cell-RNTI (C-RNTI) or a Semi-Persistent Scheduling (SPS) C-RNTI.

17. The apparatus of claim 13, wherein the CSS has an aggregation level 4 or 8, and the USS has an aggregation level 1, 2, 4, or 8.

18. The apparatus of claim 13, wherein the set of DCI information field of the first PDCCH candidate is DCI format 0 or DCI format 1A.

19. A communication method, comprising:
generating a plurality of Physical Downlink Control Channel (PDCCH) candidates including a first PDCCH candidate; and
transmitting the plurality of PDCCH candidates including the first PDCCH candidate in Common Search Space (CSS) and User Equipment-specific Search Space (USS), wherein:
the first PDCCH candidate is transmitted in the CSS, and
the first PDCCH candidate and any one of the plurality of PDCCH candidates transmitted in the USS do not have a combination of:
(1) Cyclic redundancy check (CRC) scrambled by a same Radio Network Temporary Identifier (RNTI),
(2) a same payload size,
(3) a same first Control Channel Element (CCE) index, and
(4) different sets of Downlink Control Information (DCI) information fields.

20. The method of claim 19, wherein a set of DCI information fields of any of PDCCH candidates transmitted in the USS includes a carrier indicator field.

21. The method of claim 19, further comprising transmitting a signal to cause a User Equipment (UE) to be configured with a carrier indicator field.

22. The method of claim 19, wherein the RNTI is a Cell-RNTI (C-RNTI) or a Semi-Persistent Scheduling (SPS) C-RNTI.

23. The method of claim 19, wherein the CSS has an aggregation level 4 or 8, and the USS has an aggregation level 1, 2, 4, or 8.

24. The method of claim 19, wherein the set of DCI information field of the first PDCCH candidate is DCI format 0 or DCI format 1A.

25. A communication apparatus, comprising: one or more antennas, a transceiver for performing wireless transmission and reception, a memory, and a processor operably coupled to the one or more antennas, the transceiver and the memory, to execute program instructions stored in the memory,
wherein the processor, when executing the program instructions:
monitors Physical Downlink Control Channel (PDCCH) candidates in Common Search Space (CSS) and User equipment-specific Search Space (USS); and
selects a first PDCCH candidate in the CSS as PDCCH transmitted from an eNB if the first PDCCH candidate in the CSS and a second PDCCH candidate in the USS have:
(1) Cyclic redundancy check (CRC) scrambled by a same Radio Network Temporary Identifier (RNTI),
(2) a same payload size,
(3) a same first Control Channel Element (CCE) index, and
(4) different sets of Downlink Control Information (DCI) information fields.

26. The apparatus of claim 25, wherein the set of DCI information fields of the second PDCCH candidate includes a carrier indicator field.

27. The apparatus of claim 25, wherein among the first and second PDCCH candidates, only the first PDCCH candidate is selected as PDCCH transmitted from the eNB.

28. The apparatus of claim 25, wherein the second PDCCH candidate is not selected as PDCCH transmitted from the eNB.

29. The apparatus of claim 25, wherein the processor, when executing the program instructions, causes the transceiver to receive a signal from the eNB to cause a User Equipment (UE) to be configured with a carrier indicator field.

30. The apparatus of claim 25, wherein the RNTI is a Cell-RNTI (C-RNTI) or a Semi-Persistent Scheduling (SPS) C-RNTI.

31. The apparatus of claim 25, wherein the CSS has an aggregation level 4 or 8, and the USS has an aggregation level 1, 2, 4, or 8.

32. The apparatus of claim 25, wherein the set of DCI information field of the first PDCCH candidate is DCI format 0 or DCI format 1A.

33. A communication method, comprising:
monitoring Physical Downlink Control Channel (PDCCH) candidates in Common Search Space (CSS) and User equipment-specific Search Space (USS); and
selecting a first PDCCH candidate in the CSS as PDCCH transmitted from an eNB if the first PDCCH candidate in the CSS and a second PDCCH candidate in the USS have:
(1) Cyclic redundancy check (CRC) scrambled by a same Radio Network Temporary Identifier (RNTI),
(2) a same payload size,
(3) a same first Control Channel Element (CCE) index, and
(4) different sets of Downlink Control Information (DCI) information fields.

34. The method of claim 33, wherein the set of DCI information fields of the second PDCCH candidate includes a carrier indicator field.

35. The method of claim 33, wherein among the first and second PDCCH candidates, only the first PDCCH candidate is selected as PDCCH transmitted from the eNB.

36. The method of claim 33, wherein the second PDCCH candidate is not selected as PDCCH transmitted from the eNB.

37. The method of claim 33, further comprising receiving a signal from the eNB to cause a User Equipment (UE) to be configured with a carrier indicator field.

38. The method of claim 33, wherein the RNTI is a Cell-RNTI (C-RNTI) or a Semi-Persistent Scheduling (SPS) C-RNTI.

39. The method of claim 33, wherein the CSS has an aggregation level 4 or 8, and the USS has an aggregation level 1, 2, 4, or 8.

40. The method of claim 33, wherein the set of DCI information field of the first PDCCH candidate is DCI format 0 or DCI format 1A.

* * * * *